United States Patent [19]
Kent

[11] Patent Number: 4,545,520
[45] Date of Patent: Oct. 8, 1985

[54] METHOD AND SYSTEM FOR SOLDERING INSULATION COATED PARTS

[75] Inventor: William C. Kent, Garland, Tex.

[73] Assignee: AT&T Technologies, Inc., New York, N.Y.

[21] Appl. No.: 527,882

[22] Filed: Aug. 30, 1983

[51] Int. Cl.$^4$ .................... H05K 13/00; B23K 1/12
[52] U.S. Cl. .................. 228/180.1; 228/37; 228/47
[58] Field of Search ............ 228/47, 40, 47, 180 R

[56] References Cited

U.S. PATENT DOCUMENTS

| | | | |
|---|---|---|---|
| 3,482,755 | 12/1969 | Raciti | 228/180 R X |
| 3,704,686 | 12/1972 | Schrempp | 228/37 X |
| 3,765,591 | 10/1973 | Cook | 228/180 R |
| 3,921,888 | 11/1975 | Elliot et al. | 228/37 |
| 4,149,623 | 4/1979 | Nelson | 294/110 X |

Primary Examiner—Kenneth J. Ramsey
Attorney, Agent, or Firm—R. P. Miller; M. de Picciotto

[57] ABSTRACT

Parts (10) with terminals (17) wrapped with insulation coated wire (20) are loaded into quick clamp and release fixtures (24) and then advanced by a conveyor (26) through a flux applying station (42) and then through an insulation removing and solder depositing station (46). Solder is pumped through a well (47) and divided into two oppositely flowing sets of streams capped by open top housings (66, 67 and 68). The hot solder flowing counter to the direction of movement of the terminals acts to melt and wash away the insulation whereafter the solder flowing in the direction of movement of the terminals acts to deposit solder on the wire wrapped terminals.

8 Claims, 8 Drawing Figures

METHOD AND SYSTEM FOR SOLDERING INSULATION COATED PARTS

FIELD OF INVENTION

This invention relates to methods and systems for soldering one or more parts coated with a thermo-plastic insulation, and more particularly, to a conveyorized facility for releasably holding parts that are advanced along a solder filled channel, wherein a portion of the solder flows in a direction opposite to the direction of advance of the parts to remove the insulation, and the remaining portion of solder flows in the direction of advance of the parts to deposit solder on the parts.

BACKGROUND OF THE INVENTION

In the course of manufacture of certain electrical devices, it is often necessary to apply solder to parts of the device that are coated with a thermo-plastic insulation. These parts may be soldered by a manually controlled dip solder method, wherein a device, or a group of devices, is loaded in a fixture which is moved to dip the parts in a pot of molten solder. The part is held in the solder pot for a time sufficient to melt the insulation, whereafter solder is deposited on the now insulation free immersed portions of the part. Insulation removal and solder deposit at acceptable manufacturing rates is attained by heating the solder well above the solder melting point, e.g., 700° F., and then holding the parts in the solder pot for a period of time, e.g., three seconds. However, this method is still slow and the temperature encountered often results in heat damage to other portions of the electrical device.

More specifically, the use of high temperature soldering methods may induce thermo-stress or shock. For example, where the parts to be soldered are terminal posts extending from a coil frame with the ends of the insulation coated coil wires wrapped around the square terminal posts, the heat encountered in the dip process may expand the wires which are subsequently contracted during cooling to strain the wire at the junction of the wire wrappings and the square edges of the terminal posts. Such stressing at the junction may lead to breakage of the wires. In addition, the high heat may result in the melting of the insulation on the coil wires resulting in shorting out certain of the coils thus ruining the device. Further, with the use of the solder dip method, the melted insulation abets the formation and build-up of dross and other impurities on the surface of the solder pot, thus requiring frequent dross skimming operations.

What is needed is a continuous process wherein the parts may be rapidly loaded into fixtures which are transported to move the parts through a wave solder machine to remove the insulation and solder the parts, whereafter the soldered parts may be rapidly ejected from the fixtures. Numerous wave solder machines are available for applying solder to non-coated metal parts. As an example, U.S. Pat. No. 3,482,755 to J. A. Raciti, issued Dec. 9, 1969, shows a machine for producing a solder wave which crests and falls away in opposite directions. A first portion of the solder wave falls back into a solder reservoir, while the second portion is flowed along a path that is in the direction of movement of terminals projecting from the underside of a conveyor moved circuit board. The solder path along which the terminals are advanced is configured to impart turbulence to the solder stream that acts to inhibit the formation of solder icicles projecting from the terminals and solder bridges extending between adjacent terminals.

SUMMARY OF THE INVENTION

The present invention contemplates, among other things, a solder wave machine and method for flowing solder from a common well into two contiguous channel sections running in opposite directions so that insulation coated parts immersed in and advanced along the oppositely flowing solder streams cause the insulation to be melted and removed, whereafter further advancement along the stream causes the solder to be deposited on the parts.

More particularly, solder is pumped through a solder well into central portions of a set of horizontally extending channels causing a quantity of the solder to flow in first sections of the set of channels in a first direction, while the remainder of the solder flows in the other or second sections of channels in a second or opposite direction. Parts having portions coated with insulation are loaded into automatic clamp and quick release fixtures for transport by a conveyor which functions to move the insulation coated portions of the parts through the first channel sections where the counter flowing solder melts and removes the insulation from the immersed portions of the parts. Subsequent movement of the now insulation free portions of the parts through the solder flowing in the direction of movement of the parts in second sections of the channels results in the deposit of solder. The lengths of the channels are selected to be long enough to ensure that the insulation is removed and the solder is deposited at relatively low temperatures so that heat damage to other portions of the parts is avoided. The insulation that is melted is immediately washed away. Further, the flow rate of the solder stream through the solder applying sections of the channels is controlled so as to be at the same rate as the advance of the parts to thereby minimize the formation of bridging solder icicles.

BRIEF DESCRIPTION OF DRAWING

Other advantages and features of the invention will be apparent upon consideration of the following detailed description in conjunction with the drawing wherein.

DETAILED DESCRIPTION

The method and system constituting the present invention may be utilized to apply solder to many diverse insulated coated parts, such as terminals wrapped with thermo-plastic coated wires and extending from a circuit board or a connector. However, the description will be directed to the soldering of wrapped terminals extending from a bobbin on which is wound convolutions of thermo-plastic coated wires. One such device is known as a ferrod sensor which finds extensive use in telephone switching systems.

Figure 1:
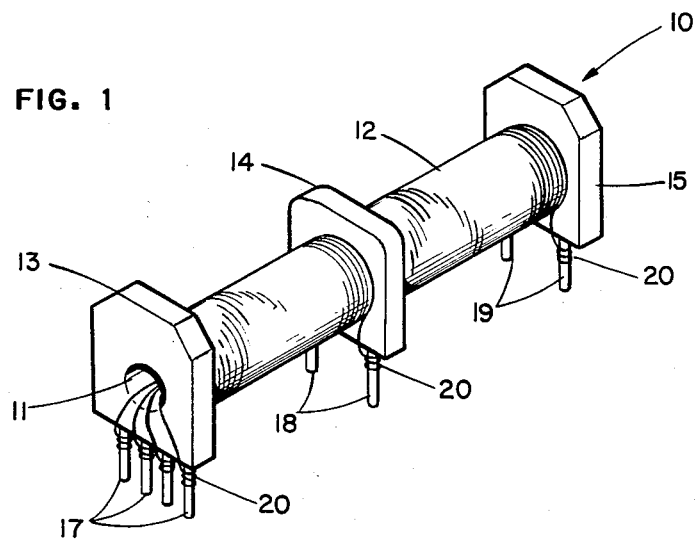
FIG. 1 is a perspective view of one type of insulation coated part that may be soldered by the method and system of the present invention.

Referring to FIG. 1, there is shown a part 10 to be soldered. The part, e.g., a ferrod sensor coil, consists of a core body 11 with wraps of thermo-plastic insulated wire 12. The core is provided with three flanges 13, 14 and 15 from which extend three sets of square cross-sectional terminals 17, 18 and 19. Each of the terminals is wrapped with several turns of insulated wire 20. It is an applied object of the present invention to provide a solder machine, for melting the insulation on the terminal wire wraps and solder bond the wire wraps to the terminals.

More particularly, referring to FIGS. 2, 3, 4 and 5, the parts 10 are manually loaded at a load station 21 into pairs of nests 22 and 23 formed in one of a group of fixtures or carriers 24 mounted on pins 25 extending from a conveyor chain 26. Each carrier includes a plate 27 which is formed with a slot 28 in which is pivotally mounted a pair of part gripping levers 29 and 30 on an axle pin 31. First ends 32 and 33 of the levers are biased apart by an interposed spring 34 seated within opposed blind holes 35 and 36 formed in the respective levers. In use, an attending operator pushes a pair of parts down into the nests to pivot the levers 29 and 30 against the action of the interposed spring 34 which reacts to urge the levers to engage and hold the parts in the nests. The entries to the nests and the lever ends are beveled or rounded to facilitate the entry of the parts into the nests.

Figure 2:
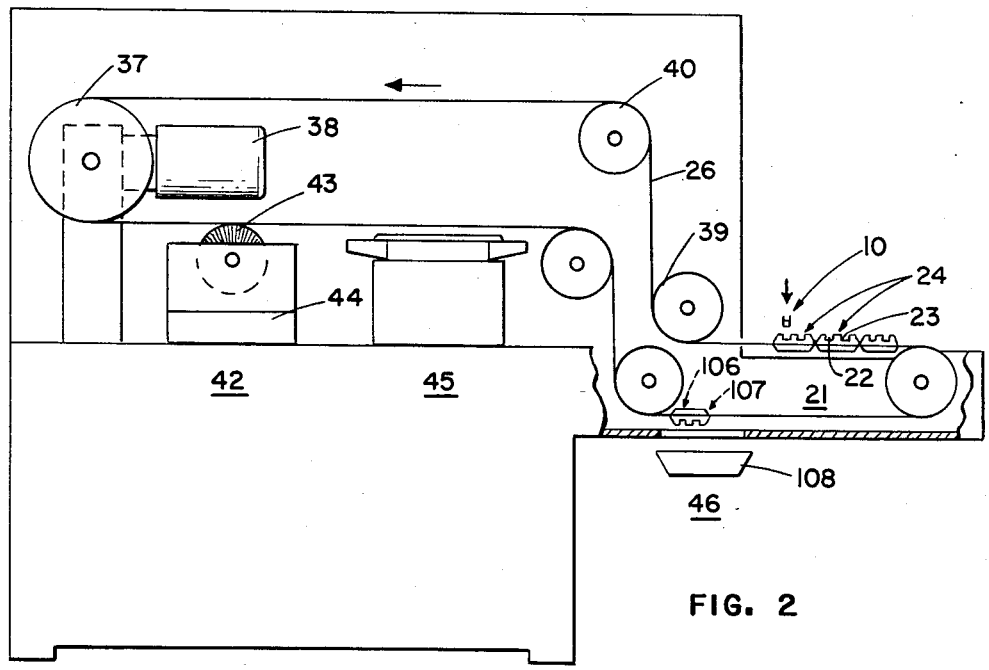
FIG. 2 is a general schematic view of the conveyor system for advancing quick load and release fixtures through a solder applying apparatus embodying the principles of the present invention.
Figure 3:
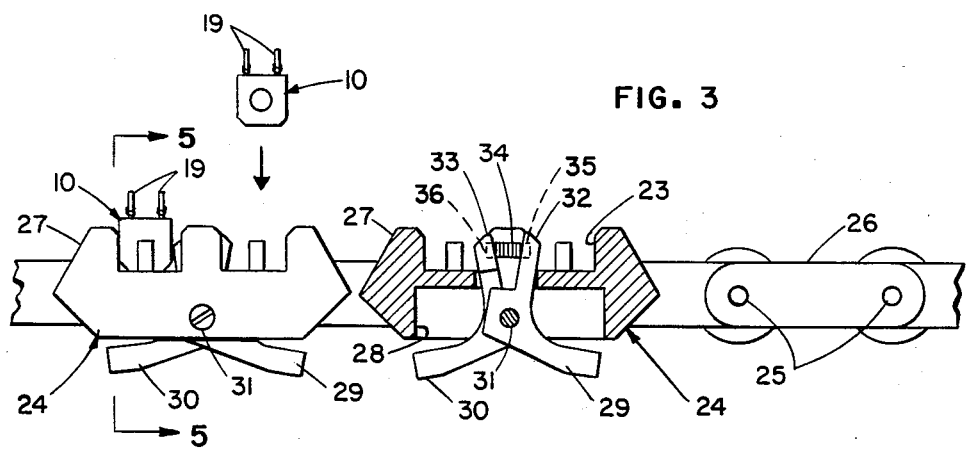
FIG. 3 is a side view of a number of workholding fixtures mounted on a conveyor chain with the view partially cut away to illustrate a quick load and release mechanism.
Figure 4:
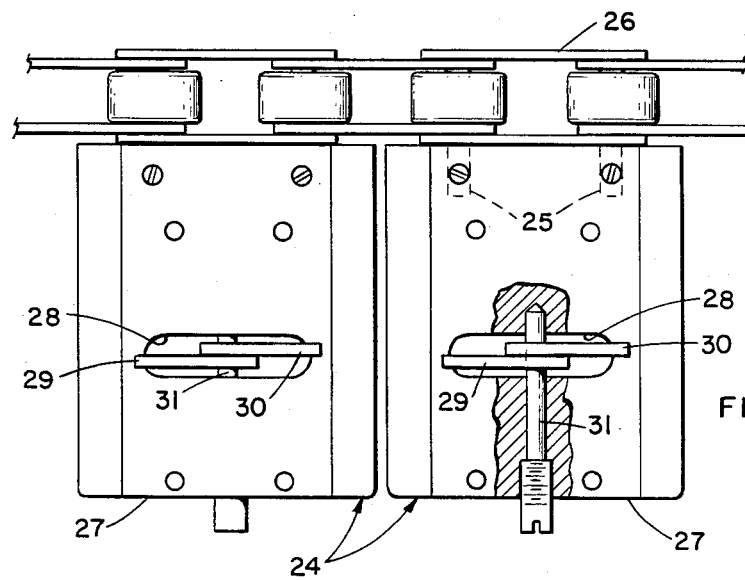
FIG. 4 is a top view of the fixture shown in FIG. 3.
Figure 5:
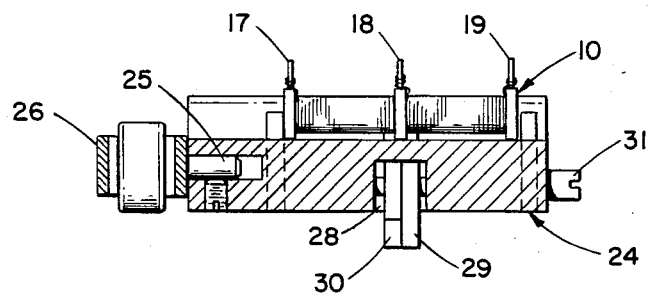
FIG. 5 is a sectional view taken along line 5—5 of FIG. 3 showing a part clamped in the workholding fixture.

As disclosed in FIG. 2, the conveyor chain 26 is advanced by a sprocket 37 driven by a controlled speed motor 38. The conveyor chain passes over idler sprockets 39 and 40 and over the drive sprocket 37 to turn the carriers upside down whereupon the now downwardly extending terminals 17, 18 and 19 are moved through a flux applying station 42 where a rotating brush 43 applies flux from a pool 44 to the wire wraps on the terminals.

Figure 6:
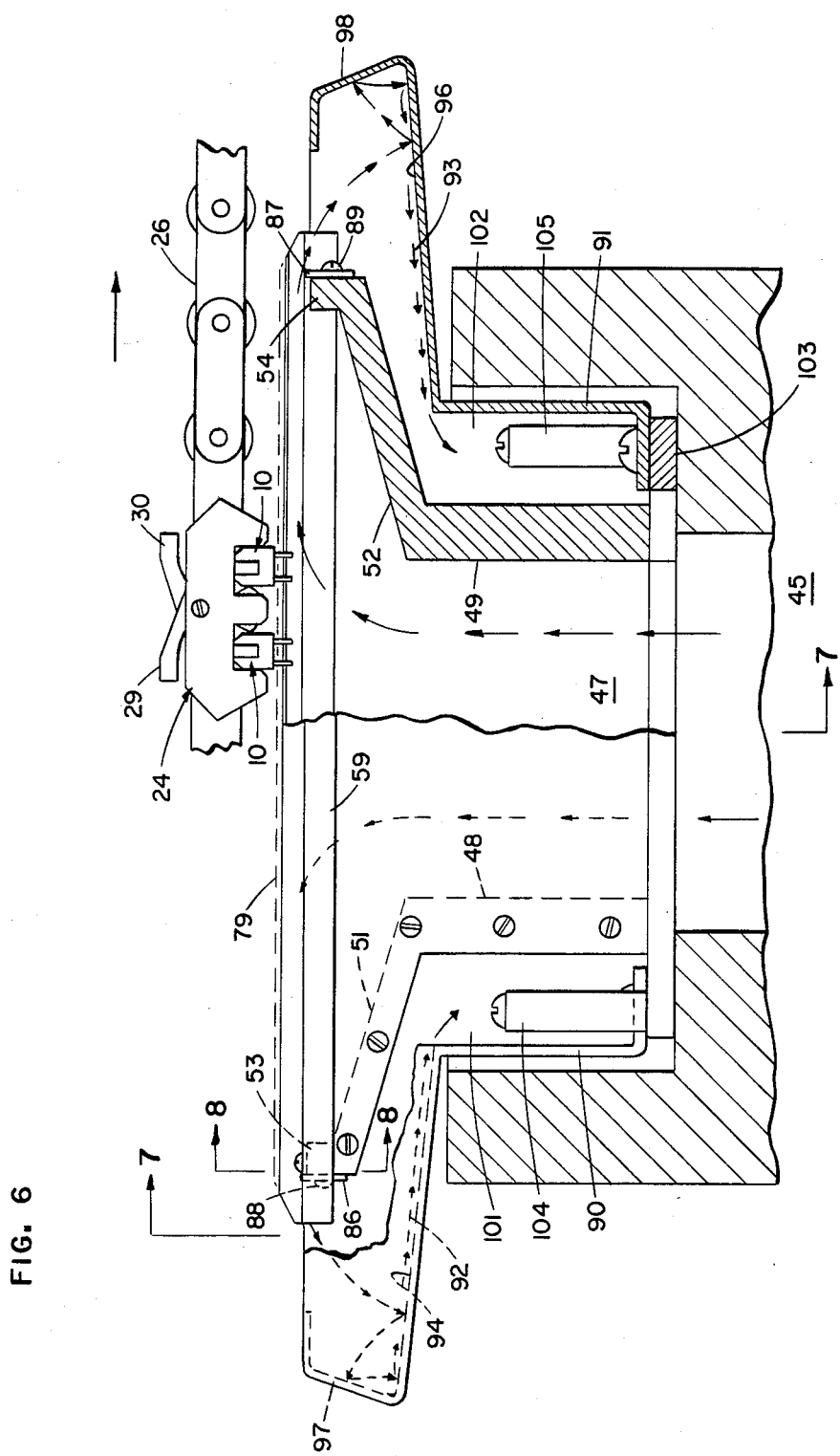
FIG. 6 is a side view of the solder applying apparatus with a side plate removed to illustrate the formation of two solder streams that flow along contiguous channels extending in opposite directions.
Figure 7:
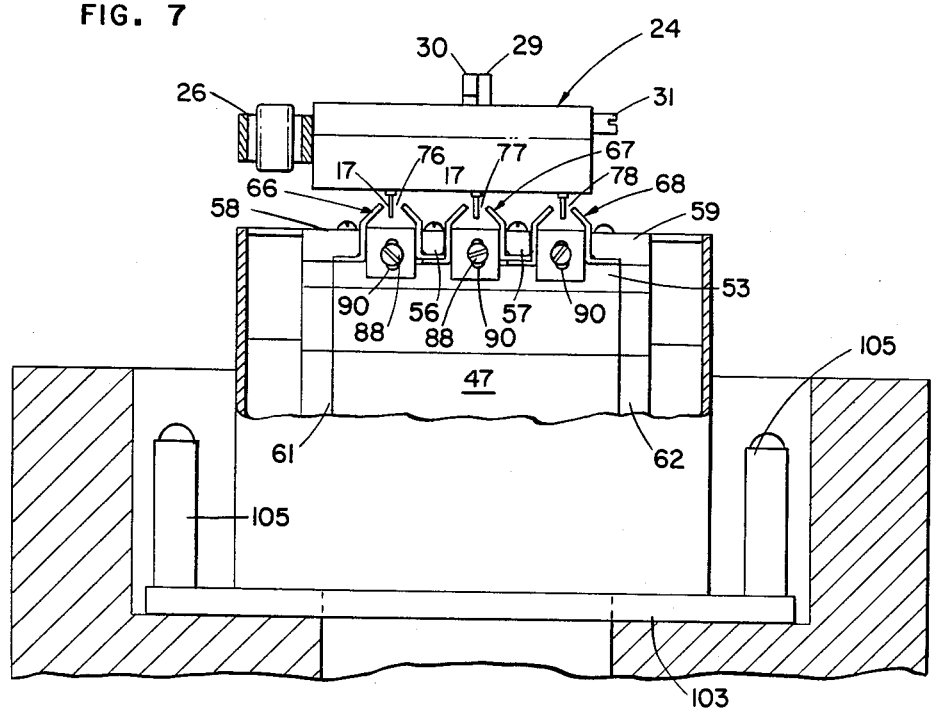
FIG. 7 is a rear view of the apparatus partially cut away to show solder channel configurations and an adjustable dam feature for controlling the solder flow rate.
Figure 8:
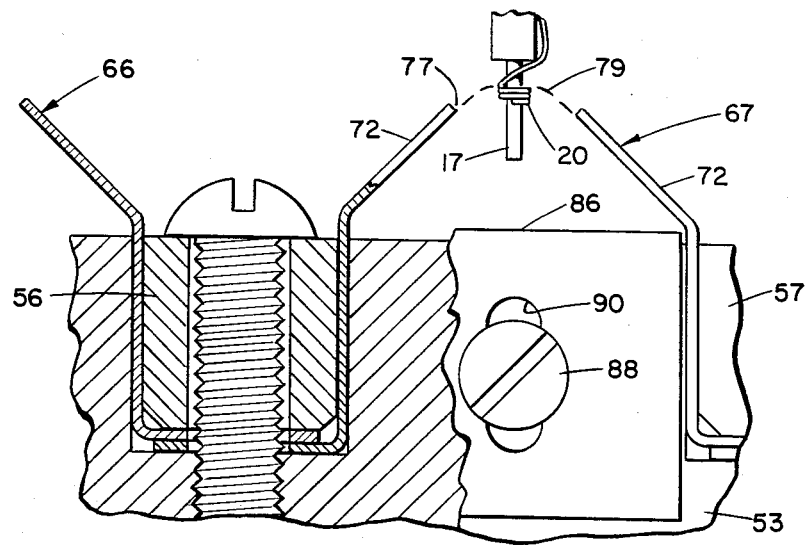
FIG. 8 is an enlarged sectional view taken along line 8—8 of FIG. 6 showing an insulation coated part immersed in the solder flowing through the channel.

Next, the conveyor chain 26 advances the parts from the fluxing station to a solder applying apparatus 45 of the type shown in FIGS. 6, 7 and 8 where the insulation on the wire wraps is melted and removed and then solder is deposited on the wire wraps. Finally the soldered devices are conveyed to an unload station 46 whereat the devices are automatically dropped from the fixtures 24.

The soldering apparatus, as shown in FIGS. 6, 7 and 8, includes a well 47 into which solder is flowed by a pump (not shown). The opposed side walls 48 and 49 of the well 47 extends upwardly and angularly along sections 51 and 52 and then upwardly along crenulated support sections 53 and 54. Secured in the troughs between crenated sections 53 and 54 are a pair of spaced rails 56 and 57 interposed between inwardly extending sections 58 and 59 of the front and back walls 61 and 62 of the well 47. Three solder channel defining housings 66, 67 and 68 are mounted in the troughs of the crenulated support sections 53 and 54 and are provided with laterally extending flanges that extend beneath the rails 56 and 57 and the sections 58 and 59. The housings project through the spaces between the rails 56 and 57 and the inwardly projecting wall sections 58 and 59 to provide three discrete solder flow channels. The housings have projecting triangular-shaped top sections 71, 72 and 73 which are terminated to provide elongated slot openings 76, 77, 78 through which the wire wrapped terminals 17, 18 and 19 are advanced.

The pressure on the solder is set so that a sufficient quantity of solder flows into and fills the housings 66, 67 and 68 with solder streams having exposed surfaces that project slightly through the openings 76, 77 and 78. The channel housings are made of a non-solder wettable material, such as titanium, hence the edges of the solder streams will be repelled which, in conjunction with the normal meniscus effect, allows the top surfaces 79 (see FIG. 8) of the solder channel streams to rise above the level of the openings in the housings. It should be noted that the solder streams do not flow over the sides of the housings 66, 67 and 68.

The solder flows as channel streams in opposite directions inside the individual channel housings and exits at opposite ends over dams 86 and 87 adjustably secured by screws 88 and 89 to the side surfaces of the upwardly extending parts of the crenulated sections 53 and 54 of the well housing. The rate of solder flow may also be controlled by adjusting the effective heights of the dams 86 and 87. More specifically, the screws extend through adjustment slots 90 formed in the dams so that the dams may be set up or down to control the volume of solder exiting over the respective sets of the dams from the associated channels.

A pair of secondary housings 90 and 91 surround the well housing to provide return paths 92 and 93 for the exiting solder. The flow of solder over the dams is such that the exiting streams are propelled in an arcuate path to strike flared sections 94 and 96 of the secondary housings at obtuse angles. The respective solder streams are bounced off the flared sections at obtuse angles and strike reverse bend sections 97 and 98 of the flared sections 94 and 96, whereafter the solder stream is diverted downwardly along the flared sections through return passages 101 and 102 returning to the solder pump well. The structure of the well 47 and the secondary housings 90 and 91 are mounted on an apertured frame plate 103 which may be secured by bolt structures 104 and 105 to the commercial pump and return reservoir facilities (not shown). Any of a number of commercial solder pumping facilities may be used, e.g., a pumping system known as Wave Dipper Mini-Pot, #WDC-6-HT, furnished by Electrovert, Ltd. of Montreal, Canada, was used in one installation of the system.

In summary of the operation of the system, pairs of parts 10 are loaded in the fixtures 24 with the insulated wire wrapped terminals 17, 18 and 19 extending upwardly. The conveyor advances the parts to move the terminals through the fluxing station 42 and then into the respective channelled solder streams wherein the parts are maintained in the stream for sufficient time to melt the plastic insulation of the wire wraps and deposit solder on the exposed wires and the underlying sections of the terminals. Inasmuch as the streams are of considerable length, the parts may be rapidly moved along the stream, and yet the parts will be in the stream long enough to melt the plastic insulation on the wires and deposit the necessary solder to effectuate a good solder bond between the wire wraps and the terminals.

The speed of the conveyor is set to equal the speed of the solder stream exiting over the dams 87 at the exit end of the channels. This allows the solder stream to fall away from the moving terminal in a substantially vertical direction, hence solder icicles, if any, are formed to extend vertically downward from the terminal. If the speeds are not the same, there would be a tendency for the icicles to form at angle so as to bridge the gaps between the terminals. Moreover, the streams, particularly the solder depositing sections of the streams, flow at a rapid rate, and hence, the parts may be advanced by the conveyor at the same rapid rate. Ultimately, the soldered parts are returned to the unload station 46 where a pair of strikers 106 and 107 are moved to hit the extremities 32 and 33 of the levers to flex the levers in a scissor-like fashion to release the parts 10 which drop into a receptacle 108.

What is claimed is:

1. An apparatus for applying solder to a terminal extending downwardly from the underside of an article which comprises:
   a housing having a solder well;
   a pair of converging shield plates longitudinallly extending to overlay the well and having their respective top portions spaced apart to provide a longitudinally extending opening therebetween;
   means for flowing molten solder through the well to divide the flow of solder into two elongated narrow streams respectively flowing up between the shield plates along two opposite longitudinal directions, each stream having a longitudinally extending exposed surface that projects slightly through the opening and rises above the level of the top portions of the shield plates without flowing over the sides of the shield plates;
   first and second dam members located between the pair of shield plates proximate to opposite ends thereof, said dam members being adjustably secured to the housing for independently controlling the flow rate of each one of the solder streams; and
   means for longitudinally advancing an article along a path parallel to the top portions of the shield plates to immerse the terminal in the solder streams flowing between the shield plates.

2. An apparatus as defined in claim 1 for applying solder to a plurality of adjacent groups of terminals extending from an article which includes
   additional pairs of shield plates and associated pairs of dam members to provide a plurality of oppositely flowing pairs of elongated solder streams, whereby each pair of streams corresponds to a group of terminals so that said solder flowing means flows the molten solder into the oppositely flowing pairs of solder streams while said article is advanced to immerse each group of terminals in a corresponding pair of solder streams flowing between a pair of shield plates.

3. An apparatus as defined in claim 2 which includes a pair of troughs each having a flared section for receiving the solder flowing over each one of the dam members and for returning the solder to the solder flowing means, each trough further having a reverse bend section attached to the flared section for diverting solder splashed in said flared section back into the trough.

4. An apparatus for applying solder to terminals wrapped with insulated wires and extending in a common direction from an electrical device, which comprises:
   an elongated channel structure having a plurality of adjacent pairs of side plates, the side plates of each pair of plates converging toward each other and being spaced apart to provide an elongated opening therebetween;
   means for flowing solder from a well to a central portion of said channel structure to divert and flow the solder in a plurality of adjacent pairs of solder streams, the streams of each pair running in opposite directions along said channel structure and having an exposed surface that projects through the opening and rises above the level of the opening;
   means adjustably mounted at opposite end sections of the channel structure for independently controlling the amount of solder flowing in each one of the streams;
   a series of fixtures for holding electrical devices having terminals projecting therefrom and arranged in a plurality of adjacent groups of terminals, each of said fixtures including a biased member for releasably holding an electrical device; and
   a conveyor for advancing the fixtures to move the plurality of adjacent groups of terminals projecting therefrom through corresponding openings in said channel structure first against the direction of solder flow in a first one of said streams of each pair of streams and then in the direction of solder flow in the second of said streams of each pair of streams, whereby said channel structure is of sufficient length so that the insulation is removed during advance of the terminals along the first streams and solder is deposited on the insulation-free wire wrapped terminals during advance along the second solder streams.

5. An apparatus as set forth in claim 4 wherein the channel side plates are constructed of non-solder wettable material for confining the solder to flow up between each pair of side plates by the meniscus effect between the solder and the non-solder wettable edges of the side plates defining each opening without flowing over the sides of said plates.

6. An apparatus as defined in claim 4 which includes: spill catching troughs at opposite ends of said channel structure for receiving the solder flowing over the adjustably mounted means and for returning the solder to said well.

7. A method of applying solder to terminals extending from an electrical device and wrapped with wire having thermo-plastic insulation, which comprises:
   flowing solder from a central source along two contiguous channel sections extending in opposite directions;
   confining the flows of solder in the channel sections between two converging shield plates spaced apart to provide an elongated opening between respective top portions thereof so that said flows exhibit an exposed surface that rises above the level of the opening without flowing over the sides of the shield plates;
   damming portions of the solder flowing out opposite ends of the channel sections;

adjusting the damming at either end of the channel sections to independently control the rate of flow therein to conform to a predetermined rate; and releasably holding the electrical device while advancing the electrical device to immerse the terminals to move along a first channel section in a direction against the flow of solder and then to move along the second channel section in a direction with the flow of solder so that the thermo-plastic insulation is completely removed from the terminals during movement through the first channel section and sufficient solder is deposited to solder bond the insulation-free wire to the terminals during movement through the second channel section.

8. A method as defined in claim 7 wherein the electrical device holding step includes:

advancing workholders with nests opening upwardly having trippable release means extending into the nests;

depositing the electrical device into a nest to be held by the releasable means;

advancing and inverting the workholders to move the terminals projecting from the releasably held electrical device through said channel sections; and tripping the releasable means upon the electrical device being advanced past the second channel section to drop the electrical device from the nest.

* * * * *